May 11, 1926.
R. J. PALMER
1,584,702
CASING FOR ELECTRIC METERS
Filed June 16, 1922
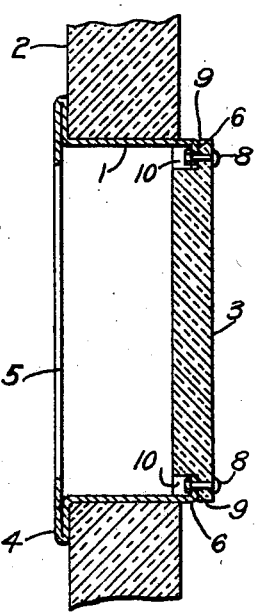
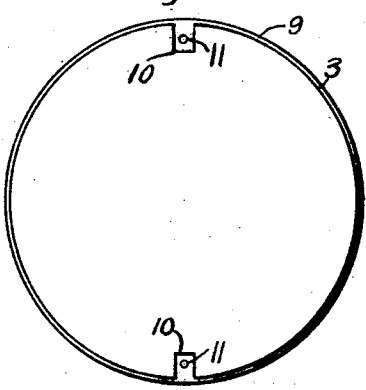
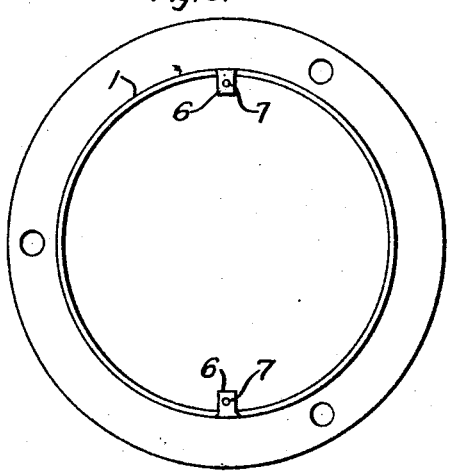
WITNESSES:
INVENTOR
Ralph J. Palmer.
BY
ATTORNEY Patented May 11, 1926.

1,584,702

UNITED STATES PATENT OFFICE.

RALPH J. PALMER, OF WILKINSBURG, PENNSYLVANIA, ASSIGNOR TO WESTING-HOUSE ELECTRIC & MANUFACTURING COMPANY, A CORPORATION OF PENNSYLVANIA.

CASING FOR ELECTRIC METERS.

Application filed June 16, 1922. Serial No. 568,874.

My invention relates to electrical measuring instruments and particularly to casings therefor.

One object of my invention is to provide a meter casing that shall be simple and durable in construction and economical to manufacture.

Another object of my invention is to provide a meter casing that shall have parts of such construction and relation as to greatly facilitate its assembly.

Another object of my invention is to provide a meter casing constructed of a relatively thin metal side-wall member and a relatively thick insulating base member that shall be so proportioned and interfitted as to render the casing compact and neat in appearance.

Heretofore, in a certain class of electrical measuring instruments, it has been usual to attach a flat plate base member to one end of a cylindrical side wall member by means of screws or bolts which usually extended through openings in the base member into openings in the side-wall member. While the openings in the respective members were adapted to register, for the reception of the screws, such registration was only effected by hand-and-eye adjustment, resulting frequently in much tedious effort before exact registration could be obtained. Also the relation of the discoidal base member to the end of the cylindrical member was very often such as to cause fumbling of the parts during assembly, such as in an attempt to quickly and accurately place a disc on the end of a thin walled tube of the same diameter and then adjust the same angularly about the longitudinal axis of the cylindrical member and to place screws at particular points thereabout. In manipulating such unhandily related parts, the operation of assembly was further regarded by the necessity of handling small screws, while, at the same time, trying to maintain the relation of the loosely engaged casing members.

In practicing my invention, I provide an instrument casing comprising a cylindrical side-wall member and a discoidal base member that are constructed and related to permit them to be easily and quickly so placed in definite semi-fixed angular relation as to permit the final attaching or permanent holding means to be readily operated, thus greatly faciltating the operation of assembling the parts and economizing in the manufacture of the instrument. The parts are so proportioned and interfitted as to render the casing compact, fluid tight and neat in appearance.

Of the accompanying drawings, Figure 1 is a cross-sectional view of a meter casing embodying my invention and a panel or other support in which it may be mounted, Fig. 2 is a front or inner-surface view of a base member constituting a portion of the casing and Fig. 3 is a rear view of a side-wall member of the casing.

A meter casing constructed in accordance with my invention comprises, in general, a cylindrical side-wall member 1 supported in a panel or other support 2, and a discoidal base or rear wall member 3.

The cylindrical side-wall member 1 is preferably constructed of relatively thin sheet metal having a doubly-bent front flange 4 to provide a window 5 and a shoulder for engagement with the panel 2. The member 1 is also provided, on its rear end or edge, with angularly-spaced inwardly and radially extending lugs 6 having openings 7 for the reception of screws or bolts 8.

The base member 3, preferably constructed of relatively thick insulating material, has a portion of such diameter as to closely and telescopically fit the inner surface of the side-wall member 1 for a slight distance from the rear end of the latter and a rear portion of such larger diameter as to provide a shoulder 9 with which the rear edge of the member 1 is adapted to engage.

Recesses 10 are provided in the front portion of the base member 3, adjacent to the perimeter thereof, to register with the lugs 6. Openings 11 extend between the bottoms of the recesses 10 and the rear surface of the member 3 to register with the openings 7 in the lugs 6.

During assembly of the parts, the member 3 is placed against the rear end of the member 1 and, if necessary, turned angularly relative thereto until the lugs 6 fall into the recesses 10. This is a comparatively easy operation, requiring no extremely careful attention, because the engagement of the lugs 6 with the edges and bottoms of the recesses 10 occurs in a semi-automatic manner.

When so engaged, the base member 3 slides easily into the end of the member 1 and, by reason of its snug fit therein, may not be readily displaced. Thus, the bolts 8 may be more readily placed in position.

The relation of the parts is such that, when the bolts 8 are screwed tightly, the inner edge of the cylindrical side-wall member 1 closely engages the shoulder 9 to render the casing more fluid proof.

The construction, in addition to providing a neat and compact casing, very desirably facilitates its assembly and economizes in the manufacture thereof.

While I have shown and described a particular form of my invention, changes may be made therein without departing from the spirit and scope thereof, as set forth in the appended claims.

I claim as my invention:

1. A meter casing comprising a cylindrical side-wall member, a discoidal base member and means on each of said members for securing the same together, said members having interfitting portions permitting the members to be moved to, and positively held in, an angular position about the longitudinal axis thereof in which the securing means on the respective members register with each other.

2. A meter casing comprising a cylindrical side-wall member having a plurality of inwardly-projecting recessed lugs spaced about the base end thereof, a relatively thick discoidal base member having complementary recesses for the reception of said lugs adjacent to its inner end perimeter, said base member having screw-receiving openings extending therethrough between the bottoms of said recesses and the rear of the base member, and screws extending through said openings into said lugs to hold the members together.

3. A meter casing comprising a cylindrical side-wall member, a transverse end-plate member, and means on each of said members for co-operation with the means on the other member to hold the members together, said members having co-operating portions permitting the members to be moved to, and positively held in, an angular relative position in which the holding means on the respective members are in operative relative holding position.

In testimony whereof, I have hereunto subscribed my name this 9th day of June 1922.

RALPH J. PALMER.